US006824711B2

(12) United States Patent
Stevenson et al.

(10) Patent No.: US 6,824,711 B2
(45) Date of Patent: Nov. 30, 2004

(54) PHOSPHITE ESTER ADDITIVE COMPOSITION

(75) Inventors: Don R. Stevenson, Dover, OH (US); Thomas C. Jennings, Shaker Heights, OH (US); Mark E. Harr, New Philadelphia, OH (US); Michael R. Jakupca, Canton, OH (US)

(73) Assignee: Dover Chemical Corporation, Dover, OH (US)

( * ) Notice: Subject to any disclaimer, the term of this patent is extended or adjusted under 35 U.S.C. 154(b) by 0 days.

(21) Appl. No.: 10/086,619

(22) Filed: Mar. 1, 2002

(65) Prior Publication Data

US 2003/0001136 A1 Jan. 2, 2003

Related U.S. Application Data

(60) Provisional application No. 60/273,303, filed on Mar. 2, 2001, provisional application No. 60/314,181, filed on Aug. 16, 2001, and provisional application No. 60/315,746, filed on Aug. 29, 2001.

(51) Int. Cl.[7] .................. C08K 13/00; C08K 5/524; C08K 5/098
(52) U.S. Cl. .................. 252/400.24; 524/128
(58) Field of Search ............ 252/400.24; 524/117, 524/119, 128, 147, 150–153

(56) References Cited

U.S. PATENT DOCUMENTS

| | | |
|---|---|---|
| 2,564,646 A | 8/1951 | Leistner et al. |
| 3,281,381 A | 10/1966 | Hechenbleikner et al. |
| 3,558,537 A | 1/1971 | Hecker et al. |
| 3,755,200 A * | 8/1973 | Rhodes et al. ........... 252/400.2 |

(List continued on next page.)

FOREIGN PATENT DOCUMENTS

JP          03157437 A  *  7/1991  ........... C08L/27/00

OTHER PUBLICATIONS

USPTO obtained translation of JP 03157437 A (Jul. 5, 1991) Nosu et al.*
D. Stevenson, M. Harr, B. Hood, T. Jennings; "Flexible PVC stabilization: the phosphite approach"; Plastics Additives & Compounding; Feb. 2002; pp. 28–32; vol. 4 Issue 2; Elsevier Advanced Technology; UK.
D. Stevenson, M. Harr, B. Hood, T. Jennings; "Dover Phosbooster Advanced Phosphite Ester Technology"; Technical Bulletin 01–03; Dover Chemical Corporation, Dover, Ohio.
D. Stevenson, M. Harr, M. Jakupca; "Optimizing Cost Performance of Flexible PVC Compounds with PhosBoosters"; Vinyl Retec; Sep. 11, 2001; New Jersey.
D. Stevenson, M. Harr, M. Jakupca; "Phosphite Ester Compositions for PVC Compounds"; ACS; Aug. 29, 2001; Chicago, Illinois.
D. Stevenson, M. Harr, M. Jakupca; "Phosphite Ester Compositions for PVC Compounds"; Journal of Vinyl & Additives Technology; Mar. 2002; vol. 8, No. 1, pp. 61–69.

Primary Examiner—Matthew A. Thexton
(74) Attorney, Agent, or Firm—Buckingham, Doolittle & Borroughs, LLP; Louis F. Wagner

(57) ABSTRACT

The invention relates to a liquid polymer additive composition comprising at least one phosphite ester selected from the group consisting of aryl phosphites, alkyl phosphites, aryl/alkyl phosphites, bisphenol-A phosphites, dialkylene glycol phosphites and polydialkylene glycol phosphites, pentaerythritol phosphites, p-cumyl phenol phosphites and blends thereof and approximately from 50 to 800 ppm inclusive of zinc per 100 parts resin. The stabilizer is used as either a complete or a partial replacement of toxic-metal containing antioxidant stabilizer additives.

10 Claims, 7 Drawing Sheets

U.S. PATENT DOCUMENTS

| | | | |
|---|---|---|---|
| 3,928,267 A | | 12/1975 | Rhodes et al. |
| 3,931,364 A | | 1/1976 | Glolito et al. |
| 3,943,081 A | | 3/1976 | Brook |
| 3,998,782 A | * | 12/1976 | Hutton et al. ............... 524/117 |
| 4,116,926 A | * | 9/1978 | York ......................... 524/120 |
| 4,125,501 A | | 11/1978 | Haberlein et al. |
| 4,134,868 A | | 1/1979 | Minagawa et al. |
| 4,159,261 A | | 6/1979 | Dieckmann |
| 4,159,973 A | | 7/1979 | Hoch et al. |
| 4,174,297 A | | 11/1979 | Leistner et al. |
| 4,206,103 A | | 6/1980 | Kromolicki et al. |
| 4,244,848 A | | 1/1981 | Minagawa et al. |
| 4,282,141 A | * | 8/1981 | Minagawa et al. ......... 524/151 |
| 4,310,429 A | | 1/1982 | Lai |
| 4,333,868 A | | 6/1982 | Schmidt et al. |
| 4,340,514 A | * | 7/1982 | Housel ......................... 524/77 |
| 4,346,025 A | | 8/1982 | Leistner et al. |
| 4,402,858 A | | 9/1983 | Capolupo et al. |
| 4,601,839 A | | 7/1986 | Lai |
| 4,614,756 A | | 9/1986 | Valdiserri |
| 4,661,544 A | | 4/1987 | Quinn |
| 4,751,118 A | | 6/1988 | Wypart et al. |
| H000506 H | * | 8/1988 | Asada et al. ................ 524/128 |
| 4,782,170 A | | 11/1988 | Bae et al. |
| 5,120,783 A | * | 6/1992 | Nosu et al. .................. 524/357 |
| 5,283,273 A | | 2/1994 | Sander et al. |
| 5,364,895 A | | 11/1994 | Stevenson et al. |
| 5,374,377 A | | 12/1994 | Nguyen et al. |
| 5,414,030 A | * | 5/1995 | Kotani et al. .................. 524/99 |
| 5,519,076 A | | 5/1996 | Odaira et al. |
| 5,519,077 A | | 5/1996 | Drewes et al. |
| 5,532,401 A | * | 7/1996 | Stevenson et al. ............ 558/95 |
| 5,534,566 A | | 7/1996 | Wehner et al. |
| 5,714,095 A | | 2/1998 | Henrio et al. |
| 5,814,691 A | | 9/1998 | Kuhn et al. |
| 5,880,189 A | | 3/1999 | Croce et al. |
| 5,889,095 A | | 3/1999 | Inui et al. |
| 5,969,015 A | | 10/1999 | Zinke et al. |
| 6,013,703 A | | 1/2000 | Kuhn et al. |
| 6,022,946 A | * | 2/2000 | McCullough, Jr. ........... 528/480 |
| 6,046,263 A | | 4/2000 | Rasberger et al. |
| 6,103,796 A | * | 8/2000 | Staniek et al. .............. 524/100 |
| 6,136,900 A | | 10/2000 | Kuhn et al. |
| 6,180,700 B1 | | 1/2001 | Mahood |
| 6,362,260 B1 | * | 3/2002 | Stevenson et al. .......... 524/115 |

* cited by examiner

PHOSPHITE ESTER ADDITIVE COMPOSITION

This application claims priority from U.S. provisional patent application Ser. No. 60/273,303 filed Mar. 2, 2001, U.S. provisional patent application Ser. No. 60/314,181 filed Aug. 16, 2001, and U.S. provisional patent application Ser. No. 60/315,746 filed Aug. 29, 2001.

TECHNICAL FIELD

The invention relates generally to improving the performance and reducing the heavy metal content of PVC compounds by the partial or total substitution of conventional mixed metal stabilizers with phosphite esters, or blends thereof, with an effective amount of added zinc.

BACKGROUND OF THE INVENTION

The PVC industry began with the invention of plasticized polyvinyl chloride ("PVC") by Waldo Semon of the B. F. Goodrich Company in 1933 as an alternative to natural rubber where its non-flammability made it ideal for wire insulation, particularly on naval ships. However, unlike rubber, PVC has a tendency to discolor and is not easy to process well. Stabilization is required to perform two basic functions: (1) prevent discoloration; and (2) absorb hydrogen chloride (HCl) which evolves during process. It is believed that billions of pounds of flexible PVC are employed throughout the world in a wide variety of commercial applications. These include vinyl flooring, wall covering, roofing, pond and pool liners, film, upholstery, apparel, hose, tubing and wire insulation.

In order to successfully process vinyl compounds into finished vinyl articles by extrusion, calendering or molding, it is necessary to incorporate between one and five percent of a heat stabilizer to prevent dehydrohalogenation and discoloration of the polymer during thermal processing. The preferred vinyl heat stabilizers for most flexible PVC applications in the United States are referred to as "Mixed Metal" heat stabilizers. They are complex multi-component chemical admixtures based upon combinations of alkaline earth and heavy metal salts with a variety of antioxidants, HCl absorbers and chelating agents. The most widely used mixed metals are based upon and referred to as Barium-Cadmium, Barium-Cadmium-Zinc, Barium-Zinc and Calcium-Zinc stabilizers. However, mixed metal heat stabilizers suffer from several drawbacks. If the level of zinc is too high, the polymer will char very rapidly. Additionally, barium and cadmium are toxic heavy metals which while they do provide heat stability, their presence adversely affects clarity, plate out and stain. In order to counteract these negative effects, further additional components were blended into the formulations, making PVC additive formulation and processing a highly unique and specialized art. Clearly, what was needed was an approach which used higher performance phosphites and added back only what was needed.

Phosphites can stabilize the PVC in a variety of mechanisms. They have been shown to scavenge HCl and replace labile chlorine (via the Arbuzov rearrangement), add to double bonds, decompose peroxides and complex Lewis acids. The need for heavy metals such as cadmium and barium can be eliminated by choosing the correct phosphite and optimizing the level of zinc in the PVC formulation. The phosphites were chemically designed to build mechanism into the molecule itself to perform the various functions required to stabilize flexible PVC. The resulting complex phosphite esters are liquid stabilizers, designed to be used either as partial or full replacements of mixed metal stabilizers in conjunction with small, but effective amounts of zinc.

This invention illustrates the manner in which various phosphite esters and phosphite ester blends can be used to augment, and replace, partially or completely, heavy metal components of mixed metal vinyl heat stabilizers, especially for both flexible and rigid PVC.

SUMMARY OF THE INVENTION

The invention discloses specific phosphite esters which when used in conjunction with small carefully controlled quantities of active zinc compounds, can replace partially or completely conventional high performance state of the art commercial mixed metal heat stabilizers on a part for part basis, while not only retaining, but actually improving the high heat stability and performance of the barium cadmium zinc or barium zinc products. Concurrently, and also surprisingly, the direct replacement of the barium cadmium zinc and barium zinc based stabilizers with the phosphite based compositions of the invention improve a multitude of ancillary and final properties of the PVC compounds.

The invention is directed to an additive composition which substantially reduces the content of mixed metal stabilizers based upon the toxic metals of barium and cadmium, by replacing those stabilizers with essentially toxic metal free phosphite ester compositions disclosed herein with small (catalytic, in the ppm range) amounts of zinc.

It is another object of this invention to improve certain ancillary properties of all mixed metal stabilizers, including calcium zinc types, with regard to their ability to improve initial color retention, clarity, plate out resistance, volatility, printability and compatibility of flexible PVC compounds by methods disclosed herein.

It is yet another object of this invention to disclose a method of totally replacing mixed metal stabilizers with essentially toxic metal free phosphite ester compositions disclosed herein with small (catalytic) amounts of zinc.

These and other objects of the present invention will become more readily apparent from a reading of the following detailed description taken in conjunction with the accompanying drawings wherein like reference numerals indicate the parts and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
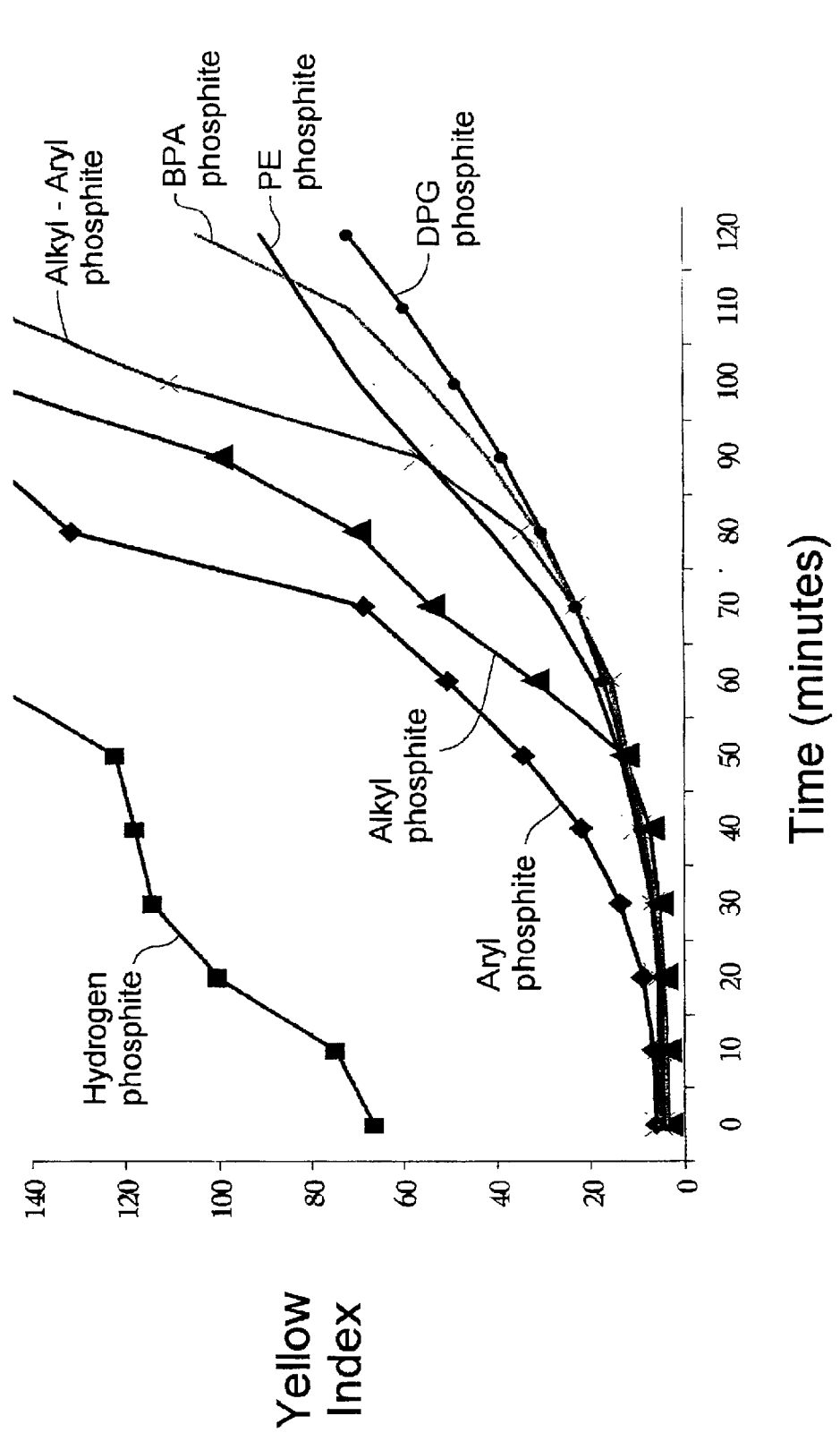
FIG. 1 is a graph over time of the impact on oven aging by varying the class of phosphite stabilizer used to stabilize PVC (as measured by Yellowness Index) using 100 parts PVC resin, 45 parts dioctyl phthalate, 20 parts $CaCO_3$, 5 parts epoxidized soybean oil, 0.25 parts stearic acid, 0.2 parts zinc stearate, and 2 parts of various classes of phosphites.

Referring now to the drawings wherein the showings are for purposes of illustrating the preferred embodiment of the invention only and not for purposes of limiting the same, the Figures show various comparisons of phosphite ester/Zn additive compositions with that of various Prior Art additives. As illustrated in FIG. 1, the efficacy of all classes of phosphites is not equivalent. The hydrogen phosphites are the least effective class of phosphite esters, whereas the bisphenol-A phosphites as well as the dipropylene glycol phosphites showed extended resistance to yellowing over time. Within each class of phosphite, the performance for particular phosphites was very similar.

Figure 2:
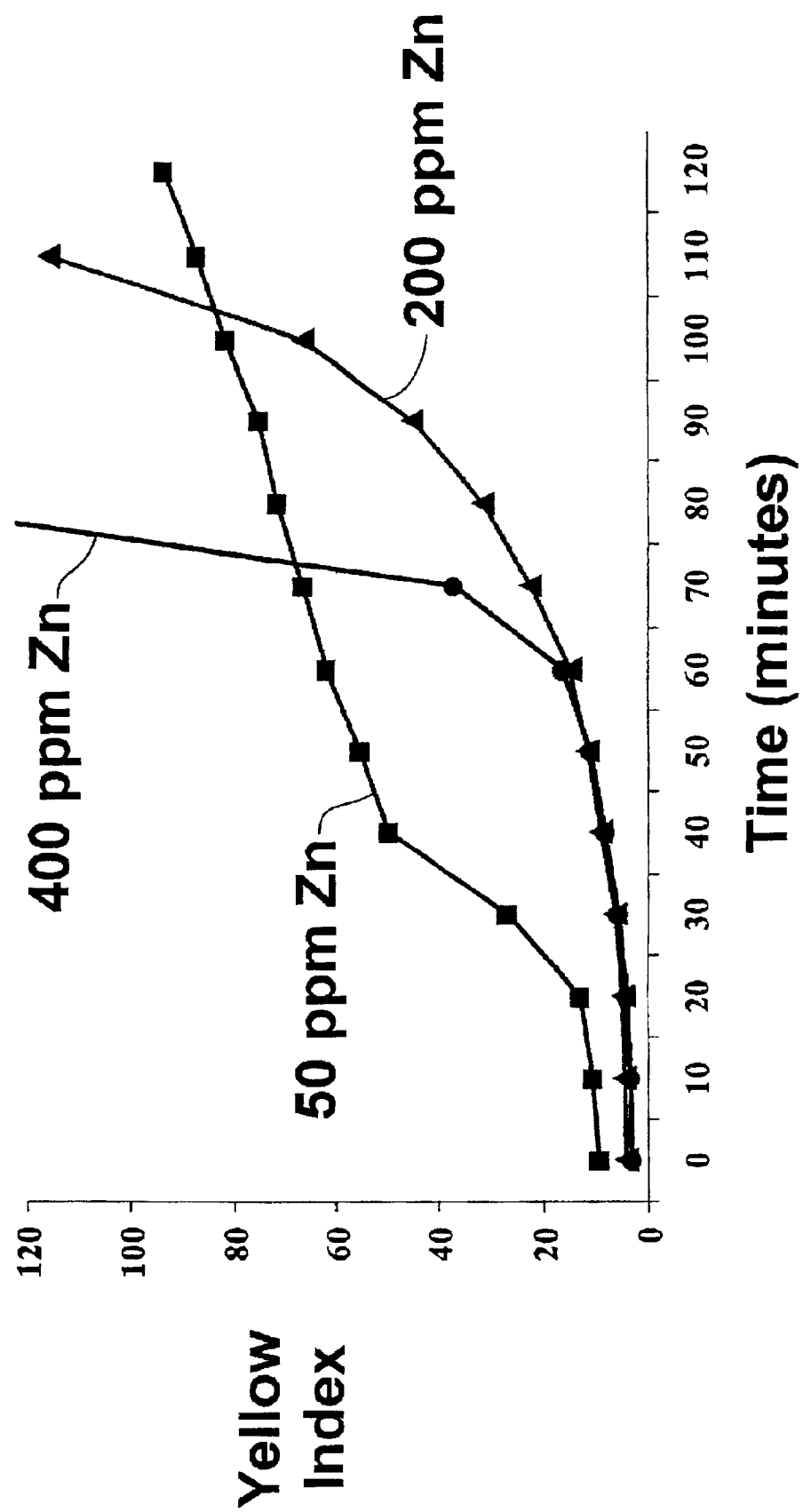
FIG. 2 is a graph over time of the impact of oven aging by varying the amount of added zinc used with diphenyl ethylhexyl phosphite (as measured by Yellowness Index) using 100 parts PVC resin, 45 parts dioctyl phthalate, 20 parts $CaCO_3$, 5 parts epoxidized soybean oil, 0.25 parts stearic acid, 2 parts diphenyl ethylhexyl phosphite, and various amounts of zinc stearate.

The level of zinc present in the stabilizer affects the performance of the additive. As noted in the Prior Art, early color is improved with added zinc. However, as shown in FIG. 2, a window of optimum zinc level exists, the specific range of the window being somewhat unique for each phosphite class. If the zinc concentration is too low, the early color will not be acceptable. If the zinc concentration is too high, the PVC will char at earlier exposure times. This effect is displayed for an alkyl-aryl phosphite (i.e., diphenyl ethylhexyl phosphite) in FIG. 2, although the relationship is demonstrated for all classes of phosphite esters.

Figure 3:
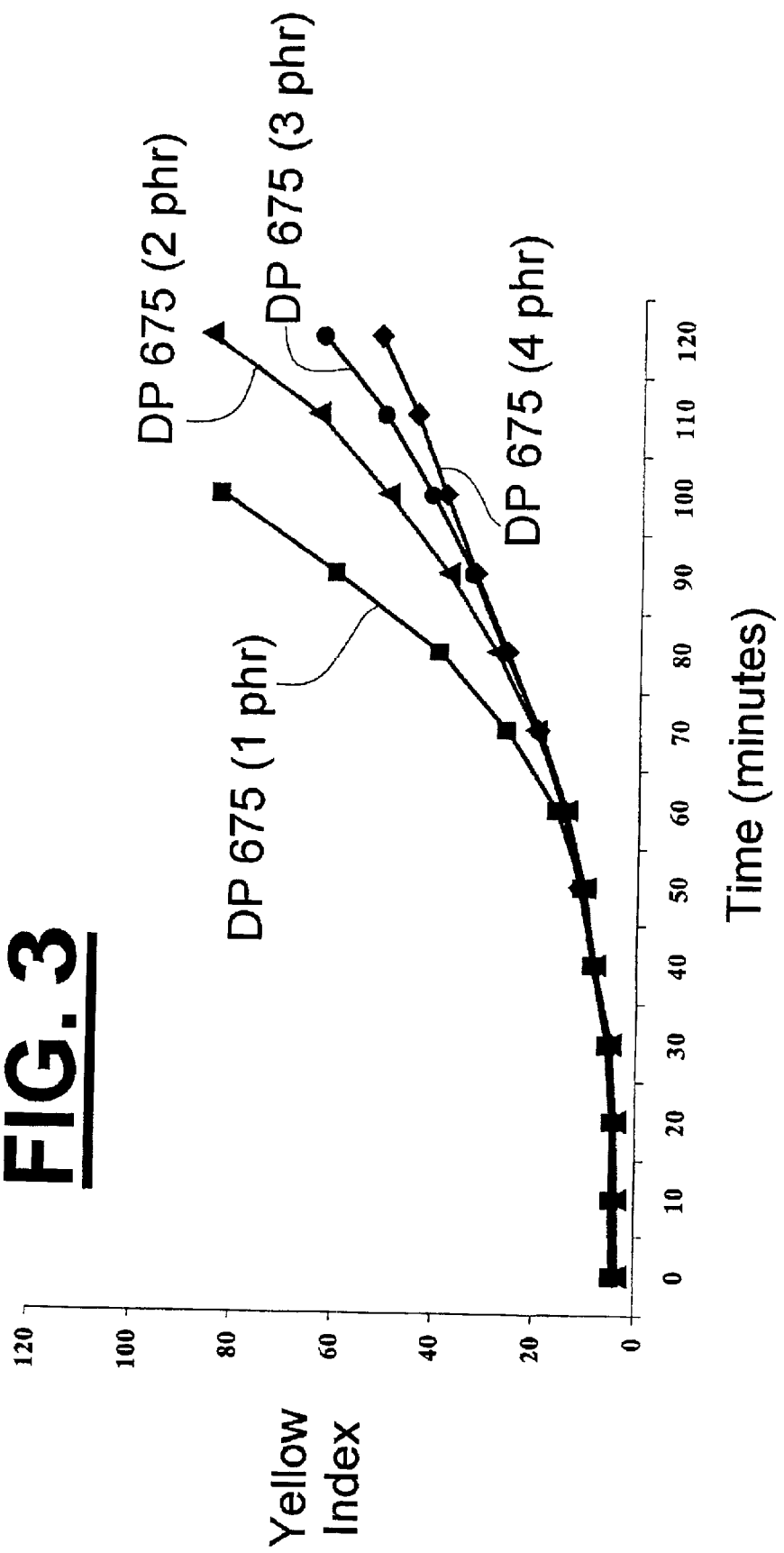
FIG. 3 is a graph over time of the impact on oven aging by varying the amount of tetraisodecyl bisphenol A diphosphite used to stabilize PVC (as measured by Yellowness Index) using 100 parts PVC resin, 45 parts dioctyl phthalate, 20 parts CaCO$_3$, 5 parts epoxidized soybean oil, and 0.2 parts zinc stearic acid and various amounts of bisphenol A-based phosphite.

Although the zinc level has an optimum value for effectiveness, the level of phosphite does not appear to be as sensitive. In general, the long-term color improved with an increase in the level of phosphite as shown in FIG. 3. The increase in phosphite level (i.e., Doverphos® 675, a C$_{10}$ bisphenol A phosphite) had little effect on the color of the PVC strip before 50 minutes, but extended the final char time to greater than 120 minutes. Again, this trend was observed for most classes of phosphites. Thus phosphites can replace other heavy metal stabilizers by complexing acidic Zn, in addition to reacting with labile chlorides and HCl.

Figure 4:
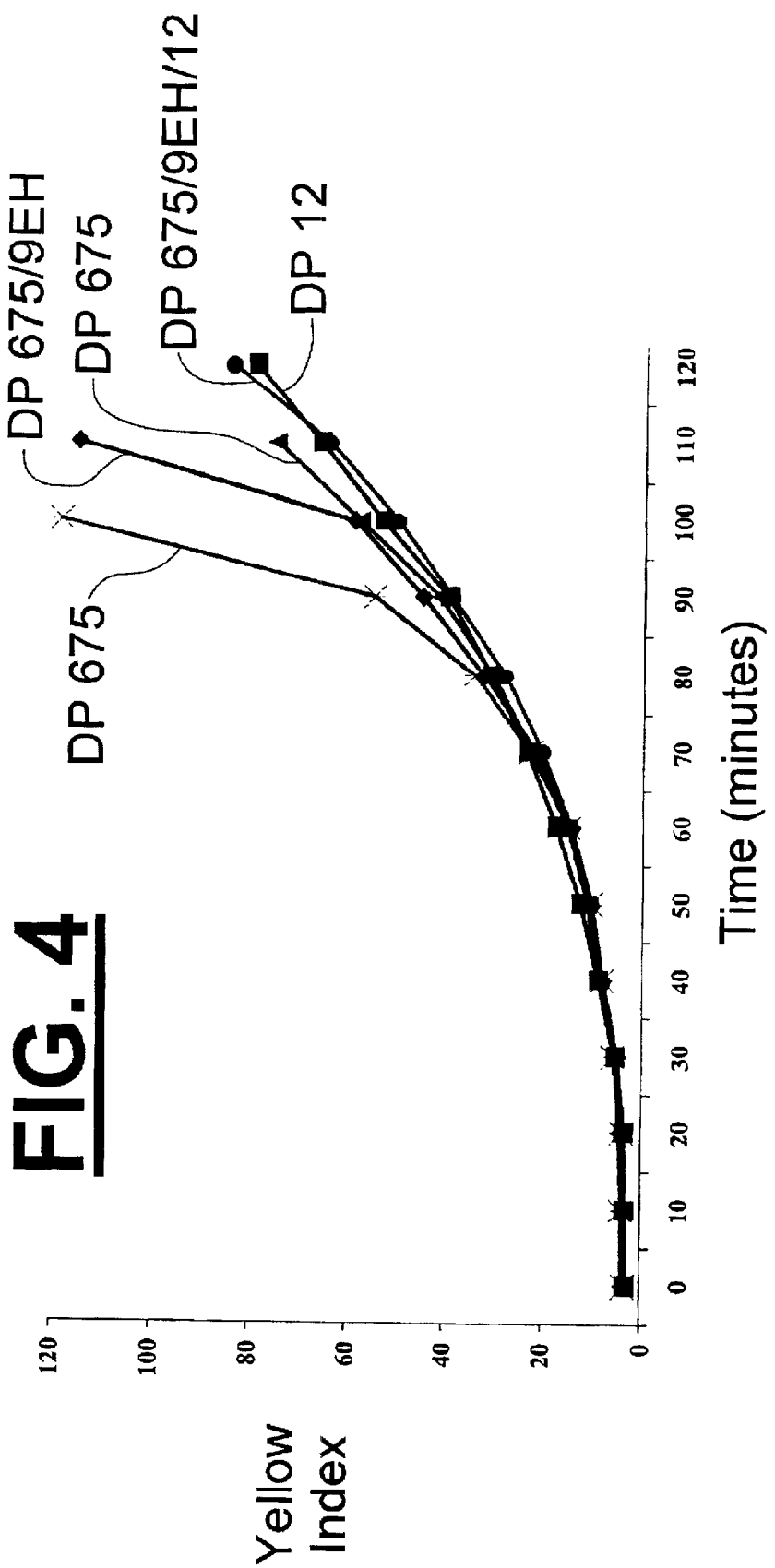
FIG. 4 is a graph over time of the impact on oven aging by varying the phosphite or phosphite blend used to stabilize PVC (as measured by Yellowness Index) using 100 parts PVC resin, 45 parts dioctyl phthalate, 20 parts CaCO$_3$, 5 parts epoxidized soybean oil, and 0.25 parts stearic acid, 0.25 parts zinc stearate and 2.0 parts phosphite or phosphite blend.

Synergistic effects were observed using combinations of phosphite classes. FIG. 4 displays blends of alkyl-aryl, DPG and BPA based phosphites. The total concentration of phosphite remained constant at 2.0 parts. It is obvious that the addition of a higher performance phosphite such as Doverphos® 12 (poly (dipropylene glycol) diphosphite) increases the performance of Doverphos® 9-EH (diphenyl ethylhexyl phosphite) when blended at a ratio of 1:1. More than one phosphite can be blended into the composition as shown by the 1:1:1 blend of three phosphites (i.e., Doverphos® 675/9-EH/12) in which it is shown that the performance slightly exceeded the performance of Doverphos® 12 by itself. This is significant for cost performance since Doverphos® 9-EH is the most cost-effective commercial phosphite. A blend could be used to deliver similar performance but with the benefit of lower cost.

Figure 5:
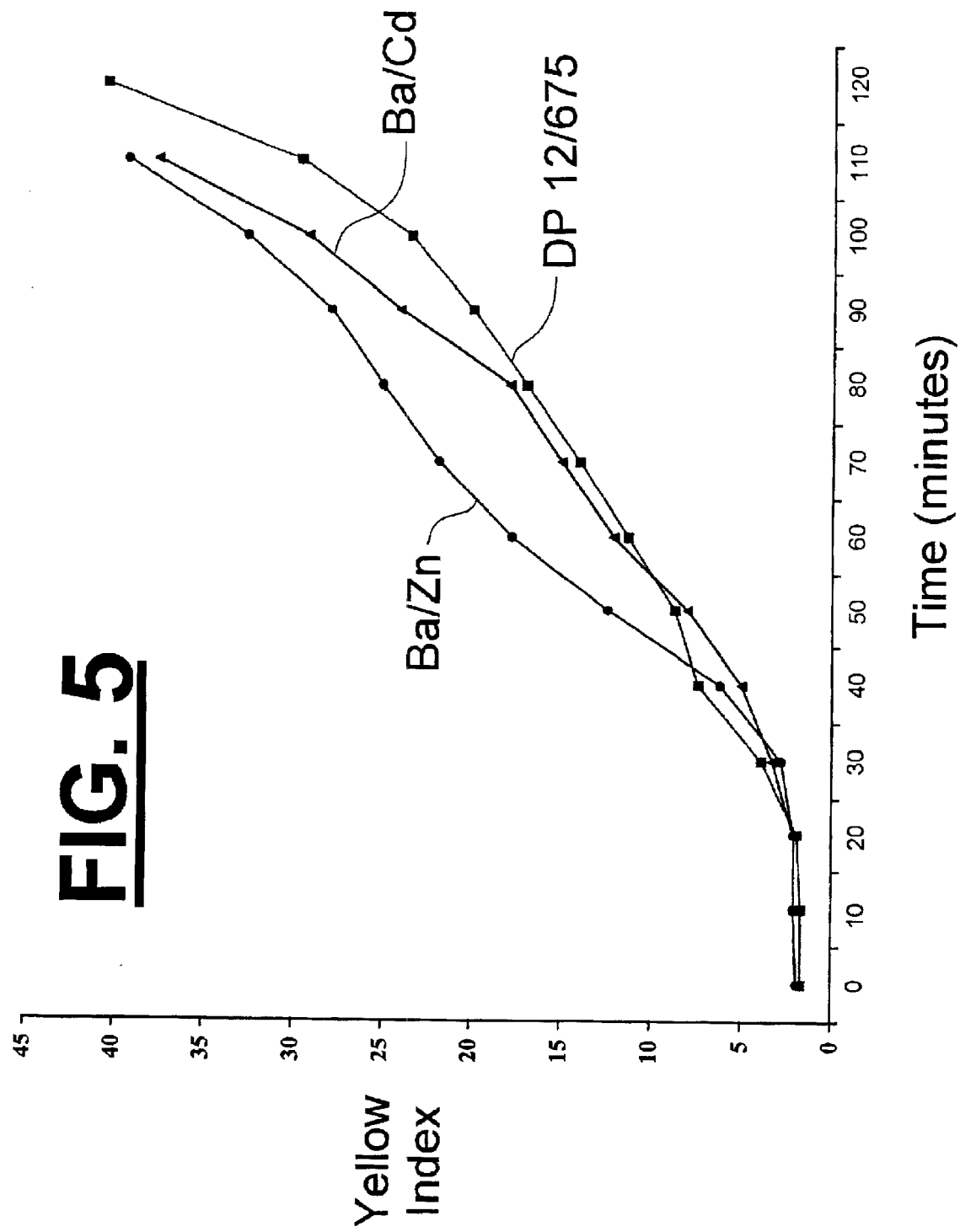
FIG. 5 is a graph over time of the impact on oven aging by comparing a phosphite of the instant invention (i.e., tetraisodecyl bisphenol-A diphosphite/poly DPG phenyl phosphite blend with 2.5% zinc octanoate) to Prior Art PVC stabilizers (as measured by Yellowness Index) using 100 parts PVC resin, 25 parts dioctyl phthalate, 25 parts CaCO$_3$, 3 parts epoxidized soybean oil, 7.0 parts TiO$_2$, and 0.5 parts stearic acid and 4 parts of stabilizer.
Figure 6:
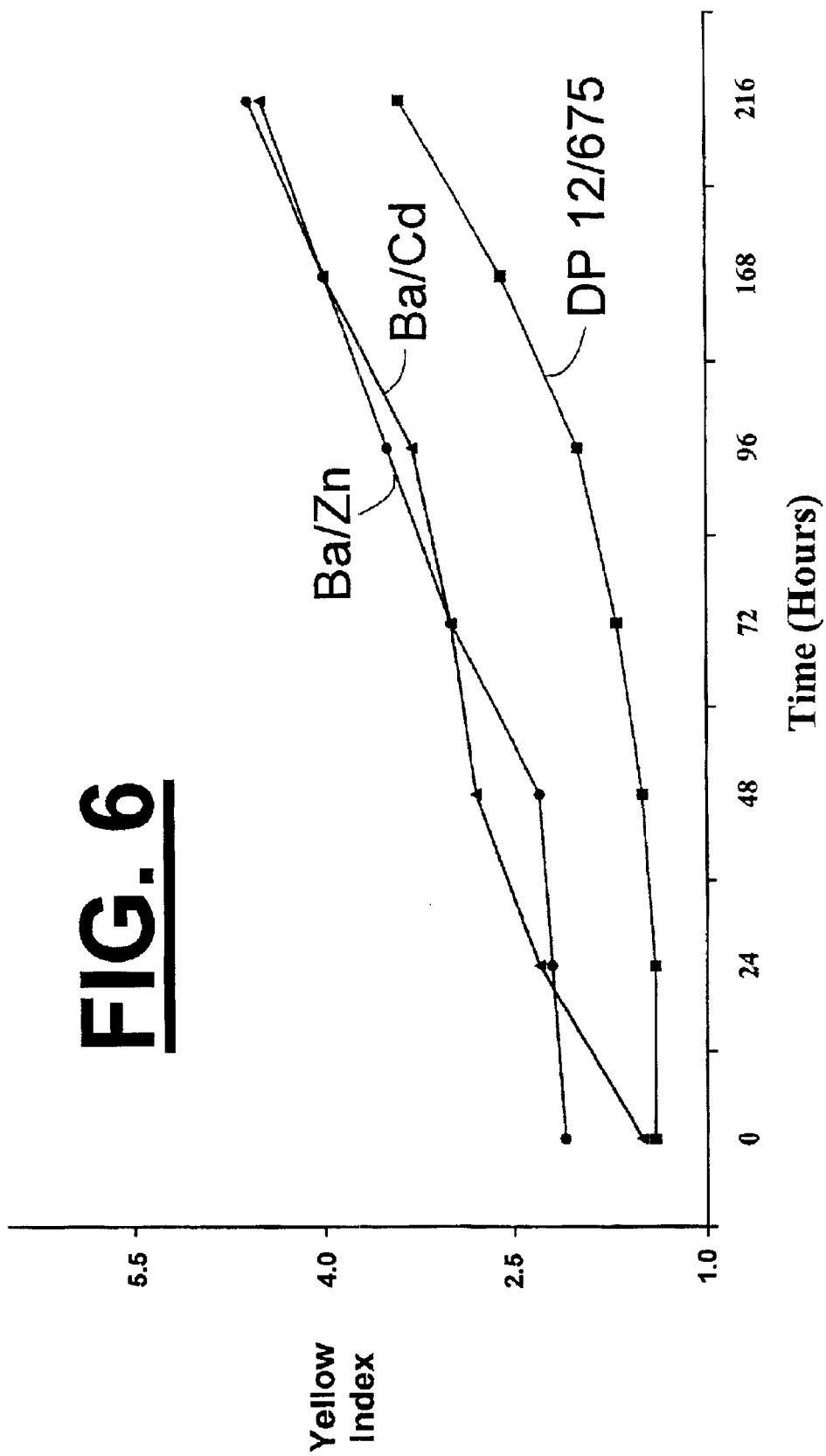
FIG. 6 is a graph over time of the impact on the QUV weathering test by comparing a phosphite of the instant invention (i.e., tetraisodecyl bisphenol-A diphosphite/poly DPG phenyl phosphite blend containing 2.5% zinc octanoate) to Prior Art PVC stabilizers (as measured by Yellowness Index) using 100 parts PVC resin, 55 parts 7–11, 3 parts epoxidized soybean oil, 7.0 parts TiO$_2$, and 0.3 parts stearic acid and 3.5 parts of stabilizer.

A 1:1 phosphite blend of Doverphos® 675/12 was compared to two typical commercially available Prior Art mixed metal stabilizers in FIG. 5. The commercial samples included a Barium-Cadmium and a Barium-Zinc stabilizer, in addition to other costabilizers. The blend of phosphites of the instant invention combined with zinc stearate outperformed the mixed metal stabilizers. Other advantages include better long-term heat stability, better UV stability, less plate out, better clarity and better economics. An example of a QUV weathering test is displayed in FIG. 6. Again, the PVC stabilized with the phosphite blend described for FIG. 5 developed less color over time when compared to the mixed heavy metal stabilizers.

Figure 7:
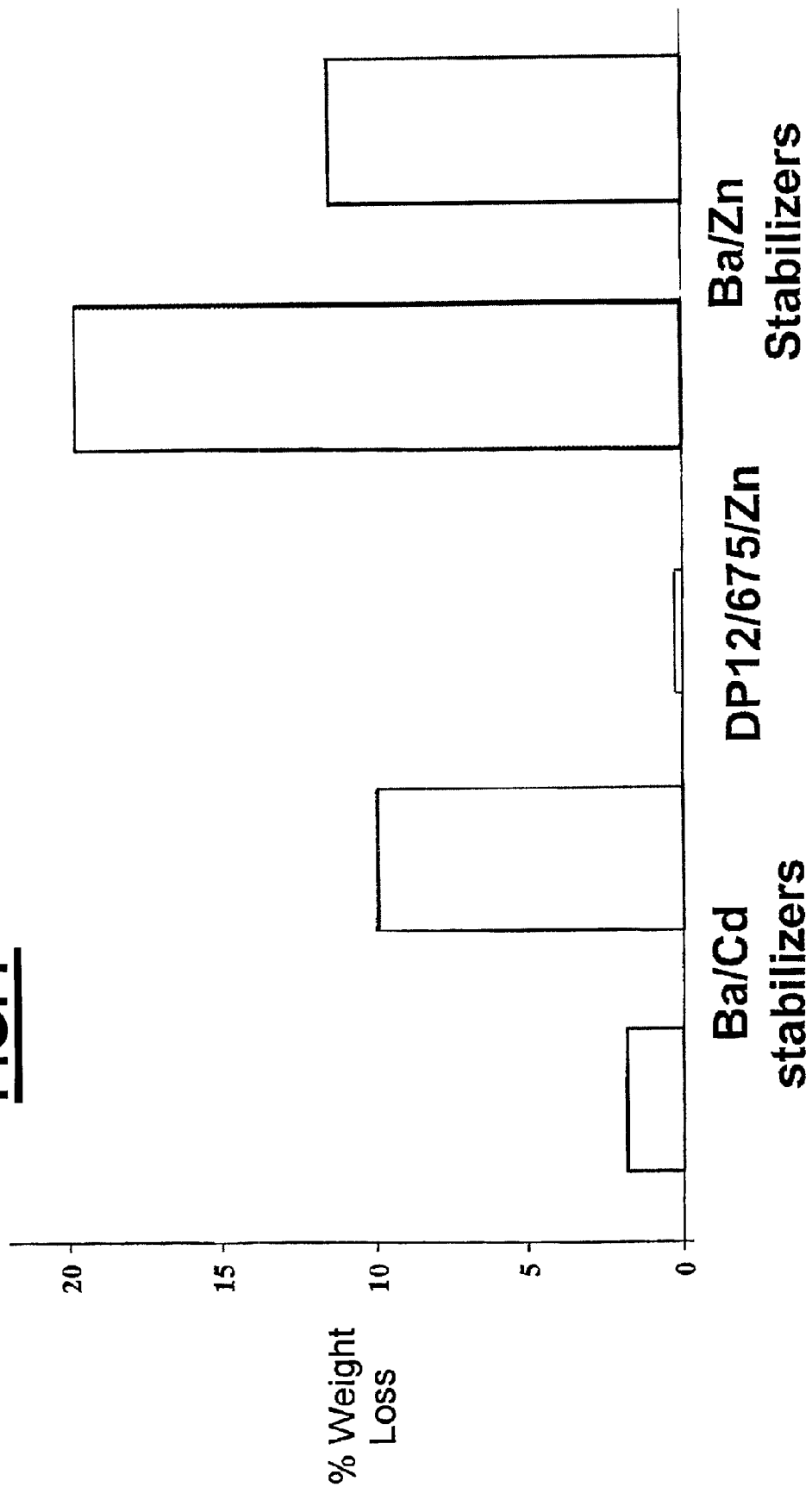
FIG. 7 is a bar chart of percentage weight loss of various stabilizers and a phosphite ester blend of the present invention after 2 hours at 110° C. illustrated in Table VI.

FIG. 7 clearly indicates the nonvolatile nature of the additives of the instant invention when compared to Prior art products. Scrap losses from moisture blush, caused by heavy metals, and from plate out, along with associated downtime from color change cleanouts, are minimized. Volatiles cause both environmental problems and plate out. The phosphites of the instant invention contain essentially no solvents, and have far less volatility than traditional mixed metal stabilizers.

One difficulty in replacing mixed metal stabilizers based upon the toxic metals barium and cadmium is based on the fact that since the advent of the liquid mixed metal phosphite stabilizers, compounders have effectively lost the ability to independently vary the ratio of metals to phosphite esters which has been controlled by the manufacturer. It has now been found as shown in the results to follow, that mixed metal stabilizers based upon toxic metals, barium and cadmium can be reduced substantially by simply reducing the barium-cadmium or barium-zinc stabilizer level and replacing it with a mixed high efficiency phosphite ester based composition and concurrently maintaining or adjusting the overall zinc level in the vinyl compound to achieve or maintain a level of zinc of 50 to 800 ppm resin, preferably, 100 to 500 ppm resin by either including a small amount of an active zinc compound in the phosphite ester or adding the appropriate amount of zinc separately as a simple zinc salt, e.g., zinc stearate. Phrased alternatively, what has been shown to be effective are the following molar percentages: approximately 0.05–0.4% zinc to 4–10% phosphorus, more preferably, 0.1–0.3% zinc to 5–8% phosphorus, most preferably 0.15–2.5% zinc to 6–7% phosphorus. Alternatively, on a molar ratio of P/Zn of approximately 80:1 to 4:1, more preferably 75:1 to 6:1, most preferably, 73:1 to 8:1.

As further shown in the tables to follow, when the levels of commercial mixed metal stabilizers are reduced and replaced with the phosphite ester-based compositions, several ancillary properties of the vinyl compound, such as initial color retention, oven aging, clarity, plate-out resistance, and compatibility improve dramatically.

Additionally, mixed metal stabilizers based upon barium and cadmium can be completely replaced by the phosphite ester based compositions of the invention by slightly nail increasing the epoxy plasticizer levels of the vinyl compounds and employing effective levels of high efficiency phosphite compositions containing or used in conjunction with specific low levels of zinc in the substantial or complete absence of any other metallic stabilizer components.

With conventional mixed metal stabilizer systems which employ phosphite esters and epoxy plasticizer primarily as secondary heat stabilizers, exudation problems can occur at elevated levels of phosphite and epoxy. It has been found that by removing the barium and cadmium salts and avoiding any soluble alkali or alkaline earth metal compounds completely, and by relying only on the presence of extremely low levels of zinc compounds, high efficiency phosphite esters and epoxy plasticizers can, in fact, be employed at levels sufficient to impart adequate stability without giving rise to the incompatibility problems associated with the state-of-the-art mixed metal stabilizer systems at the same levels of phosphite and epoxy. It is surprising and highly unexpected that the phosphite ester compositions impart adequate stability even in the absence of the metal stabilizers typically used.

Commercially used phosphites can be divided into several categories based on the structure of the alcohols that are used to synthesize the phosphite ester, and all illustrative of phosphite esters suitable for use in the invention.

| | Category Name | Structure |
|---|---|---|
| | Aryl Phosphites | |
| #1 | Tris(nonylphenyl) phosphite (DOVERPHOS® 4) | $[C_9H_{19}-\text{C}_6H_4-O]_3P$ |
| #2 | Triphenyl phosphite (DOVERPHOS® 10) | $[C_6H_5-O]_3P$ |
| | Bisphenol-A Phosphites or BPA Phosphites | |
| #3 | Alkyl($C_{12-15}$) BPA phosphite (DOVERPHOS® 613) | $[(C_{12-15}H_{25-31}O)_2-P-O-C_6H_4-C(CH_3)_2]_2$ |
| #4 | Alkyl($C_{10}$) BPA phosphite (DOVERPHOS® 675) | $[(C_{10}H_{21}O)_2-P-O-C_6H_4-C(CH_3)_2]_2$ |
| | Alkyl Phosphites | |
| #5 | Triisodecyl phosphite (DOVERPHOS® 6) | $[(\text{iso-}C_{10}H_{21})-O]_3P$ |
| #6 | Triisotridecyl phosphite (DOVERPHOS® 49) | $[C_{13}H_{26}-O]_3P$ |
| #7 | Trilauryl phosphite (DOVERPHOS® 53) | $[C_{12}H_{25}-O]_3P$ |
| #8 | Triisooctyl phosphite (DOVERPHOS® 74) | $[(\text{iso-}C_8H_{17})-O]_3P$ |
| | Dipropylene Glycol Phosphites or DPG Phosphites | |
| #9 | Tetraphenyl DPG diphosphite (DOVERPHOS® 11) | $[C_6H_5-O]_2P-O-CH(CH_3)CH_2O-CH_2CH(CH_3)O-P[O-C_6H_5]_2$ |
| #10 | Poly DPG phenyl phosphite (DOVERPHOS® 12) | $[C_6H_5-O]_2P-O-[CH(CH_3)CH_2O]_n-CH_2CH(CH_3)O-P[-O-C_6H_5]_2$ |

| Category Name | Structure |
|---|---|
| | Dialkyl/Aryl Hydrogen Phosphites |
| #11 Diphenyl phosphite (DOVERPHOS ® 213) | (C₆H₅)—O—P(=O)(H)—O—(C₆H₅) |
| #12 Diisooctyl phosphite (DOVERPHOS ® 298) | (iso-$C_8H_{17}$)—O—P(=O)(H)—O—(iso-$C_8H_{17}$) |
| | Alkyl/Aryl Phosphites |
| #13 Phenyl diisodecyl phosphite (DOVERPHOS ® 7) | (C₆H₅)—O—P[—O—$C_{10}H_{21}$]₂ |
| #14 Diphenyl isodecyl phosphite (DOVERPHOS ® 8) | [(C₆H₅)—O—]₂P—O—$C_{10}H_{21}$ |
| #15 Diphenyl 2-ethylhexyl phosphite (DOVERPHOS ® 9EH) | [(C₆H₅)—O—]₂P—O—CH₂CH($C_2H_5$)$C_4H_9$ |
| | Pentaerythritol Phosphites or PE Phosphites |
| #16 Diisodecyl PE diphosphite (DOVERPHOS ® 1220) | $C_{10}H_{21}$—O—P(OCH₂)₂C(CH₂O)₂P—O—$C_{10}H_{21}$ |
| #17 (DOVERPHOS ® 9708) | [$H_{21}C_{10}$—O—]₂P—O—CH₂\\ /CH₂—O—P[—O—$C_{10}H_{21}$]₂ <br> [$H_{21}C_{10}$—O—]₂P—O—CH₂/ \\CH₂—O—P[—O—$C_{10}H_{21}$]₂ (spiro C center) |
| | p-Cumyl Phenol Phosphites or PCP Phosphites |
| #18 Mono PCP diisodecyl phosphite | (C₆H₅)—C(CH₃)₂—(C₆H₄)—O—P[—O—$C_{10}H_{21}$]₂ |
| #19 (DOVERPHOS ® 479) | [($C_{12-15}H_{25-31}$O)₂—P—O—(2,4-substituted aryl with CH₃, t-Bu, and C(CH₃)₂)]₂ |

The phosphite ester-based compositions of the present invention, used in flexible polyvinyl chloride compounds may partially or completely replace mixed metal PVC heat stabilizers containing toxic metals such as barium or cadmium without significantly detracting from the processability or initial color retention of the PVC compounds.

The phosphite ester-based compositions may consist of one or more phosphite esters and either contain or are used in conjunction with a small, but effective amount of an active zinc compound sufficient to ensure that the overall zinc level in the vinyl compounds (based on 100 parts per hundred parts resin, i.e., phr) falls within a range of about 50 to about 800 ppm, more preferably 100 to about 500 ppm based upon the PVC resin. The active zinc compounds may be selected zinc salts, particularly zinc carboxylates, which would preferably include these soluble chemical moieties: zinc octoate, zinc 2-ethylhexoate, zinc hexoate, zinc neodecoate, zinc, decoate, zinc dodecanoate, zinc isostearate, zinc oleate; as well as these insoluble chemical moieties: zinc stearate, zinc tallow fatty acids, zinc palmitate, zinc myristate, zinc laurate, and zinc benzoate, although it is well within the skill of those in the art to determine other effective zinc compounds.

The phosphite ester-based stabilizer compositions further can totally replace commercial mixed metal PVC heat stabilizers containing toxic metals such as barium and cadmium from commercial flexible PVC compounds without a significant reduction of the heat processing stability or color stability of commercial flexible PVC compounds when used in conjunction with an effective amount of an epoxidized soybean oil plasticizer.

The phosphite ester-based stabilizer compositions further may be used in conjunction with an effective amount of organic costabilizers such as epoxy plasticizers, phenol antioxidants and beta diketones.

PhosBooster™ phosphite ester-based compositions representative for use in the present invention are disclosed in Table I whereby the specific phosphite ester or phosphite-ester blend is disclosed as a percentage by weight in addition to the amount of added zinc.

A Mathis thermotester oven was used for short term static heat stability testing. Milled samples were cut into strips (1.8 cm×25 cm) and tested at 185° C. for two hours. Performance was evaluated via yellowness index values using a Hunter-Lab D25 A optical sensor. For accelerated weathering, 7.5 mm×7.5 mm plaques of milled samples were pressed using a Genesis Press (Wabash) at 180° C. and 3 psig for 30 seconds, followed by 25 psig for 3.5 minutes. Heated molds were then cooled under 25 psig for 8 minutes. Testing was completed with a Q-U-V Accelerated Weathering Tester (Q-Panel Co.) at 60° C. Performance was evaluated through yellowness index values. For clarity testing, milled stock was press polished for 5 minutes at 177° C. to 0.125 inch (0.32 cm) thickness. The samples were then ranked according to relative clarity. With samples used in the clarity testing, calcium carbonate was omitted in order to render the analysis meaningful. For plate out testing, the samples were milled with 0.2 phr 2B red dye for five minutes at 182° C. The millings were then followed with a White clean-up mill sheet compound according to industry standards. The samples were then ranked according to relative plate out

TABLE I

| | PhosBooster ™ Compositions | Invention Examples (% by weight) | | | | | | |
|---|---|---|---|---|---|---|---|---|
| | | A | B | C | D | E | F | G |
| Phosphite | Doverphos ® 675 | | 78.5 | 97.0 | 18.0 | 73.0 | | 91.0 |
| | Doverphos ® 613 | 98.0 | | | | | | |
| | Doverphos ® 11 | | 19.0 | | | | | |
| | Mono PCP diisodecyl | | | | | | 97.0 | |
| | Doverphos ® 9708 | | | | 12.5 | | | |
| | Doverphos ® 7 | | | | 54.0 | | | |
| | Doverphos ® 53 | | | | | 24.0 | | |
| Zinc | Octanoate (20% Zn) | 2.0 | 2.5 | 3.0 | 1.2 | 3.0 | 3.0 | 8.0 |
| Plasticizer/Other | Dibenzoyl methane | | | | 2.3 | | | 1.0 |
| | Epoxidized soybean oil | | | | 12.0 | | | |

Six commercial barium and cadmium containing stabilizers listed below were used for comparison purposes in testing. These sample compositions are listed below with their relative active metal content analysis in Table II as measured by acid hydrolysis in methylene chloride followed by aqueous solvent extraction.

TABLE II

| | Prior Art Examples | | | | | |
|---|---|---|---|---|---|---|
| | $U^{(1)}$ | $V^{(2)}$ | $W^{(3)}$ | $X^{(4)}$ | $Y^{(5)}$ | $Z^{(6)}$ |
| % Ba | 0.0 | 11.3 | 5.1 | 9.4 | 11.4 | 9.0 |
| % Cd | 0.0 | 0.0 | 6.4 | 0.0 | 0.0 | 0.0 |
| % Zn | 2.7 | 2.2 | 0.9 | 1.8 | 2.1 | 2.3 |
| % Ca | 7.2 | 0.0 | 0.0 | 0.0 | 0.04 | 0.0 |

$^{(1)}$Commercially available Zn/Ca additive
$^{(2)}$Commercially available Ba/Zn (OMG 2379)
$^{(3)}$Commercially available Ba/Cd/Zn (Thermochek 2379)
$^{(4)}$Commercially available Ba/Zn (OMG 2342)
$^{(5)}$Commercially available Ba/Zn/Ca additive
$^{(6)}$Commercially available Ba/Zn (OMG 2327)

The comparative testing used PVC resin, having an intrinsic viscosity of 1.02. All formulations were mixed for ten minutes with a Hobart bowl mixer. A two-roll mill, set for 0.75 mm sample thickness was used to process the PVC samples with a front roll speed set to 30 rpm and a back roll speed set to 33 rpm. The samples were milled at 180° C. for four minutes unless otherwise specified.

resistance. For compatibility testing, milled stock was cut into strips and aged for 30 days at 71° C. and 100% relative humidity. Samples were then ranked according to relative color retention and tendency to spew. For relative clarity, ⅛" (0.32 cm) plaques were pressed at 190° C. for 2 minutes, then compared against a printed background for relative crispness of letters through the plaques. For stabilizer volatility, a percentage weight loss was measured as a difference between the start and end weight of the stabilizer samples as measured in an oven after two (2) hours at 110° C.

EXAMPLE #1

Four stabilized flexible PVC resin formulations (two Prior Art, i.e., compositions V and W as well as two of the instant invention, i.e., compositions B and C) were made in accordance with the components and quantities thereof as shown in Table III.

TABLE III

| Component | Parts |
|---|---|
| PVC Resin | 100 |
| Plasticizer | 40 |
| Epoxidized soybean oil | 5 |
| Stabilizing blend | 3 |

The Yellowness Index was measured for two prior art stabilizer additive packages in contrast to two compositions of the instant invention in Table IV in a short term static heat stability test. As is clearly seen in the table, the heat stability was not only equivalent to, but superior to Prior Art formulations, but without additional heavy metals. Equally significant to the fact that the heavy metal of Ba in the case of Prior Art formulation V and of Ba and Cd in the case of Prior Art formulation W, were eliminated in the formulations of the invention, but additionally resulted in superior clarity, a highly desirable feature in PVC signage.

TABLE IV

| | Color (Yellowness Index) Value | | | |
|---|---|---|---|---|
| Time (min) | Prior Art V | Prior Art W | B (150 ppm Zn) | C (180 ppm Zn) |
| 0 | 2.9 | 2.4 | 1.3 | 1.6 |
| 30 | 6.1 | 4.0 | 2.9 | 2.9 |
| 60 | 15.5 | 19.6 | 6.5 | 7.4 |
| 90 | 33.0 | 63.3 | 22.5 | 26.3 |
| 110 | 57.6 | 140.0 | 37.5 | 65.9 |
| Clarity | Poor | Fair | Excellent | Excellent |

EXAMPLE #2

Five stabilized flexible PVC resin formulations (two Prior Art, i.e., compositions X and Y as well as three of the instant invention, i.e., compositions D, E and F) were made in accordance with the components and quantities thereof as shown in Table V.

TABLE V

| Component | Parts |
|---|---|
| PVC Resin | 100 |
| Plasticizer | 35 |
| Epoxidized soybean oil | 3 |
| CaCO$_3$ | 20 |
| Stearic Acid | 0.2 |
| Stabilizing blend | 2.5 |

The Yellowness Index was measured for two prior art stabilizer additive packages in contrast to three compositions of the instant invention using the compositions of Table V in a short term static heat stability test. As is clearly seen in the following Table VI, the heat stability was not only equivalent to, but superior prior art formulations, but without additional heavy metals. Additionally, the volatility of the stabilizers was significantly less than that exhibited by Prior Art formulations, which is directly attributable to plate out, which increases with volatility as evidenced by the red to pink color of the clean out sheet, an undesirable feature for PVC sheets or films.

TABLE VI

| | Color (Yellowness Index) Value | | | | |
|---|---|---|---|---|---|
| Time (min) | Prior Art X | Prior Art Y | D (72 ppm Zn) | E (180 ppm Zn) | F (180 ppm Zn) |
| 0 | 1.7 | 2.4 | 1.8 | 1.5 | 1.6 |
| 15 | 2.7 | 2.6 | 2.4 | 1.7 | 2.6 |
| 60 | 19.4 | 16.9 | 11.2 | 12.1 | 16.1 |
| 105 | 28.4 | 26.8 | 20.7 | 20.1 | 20.3 |
| 165 | Char | 44.7 | 43.7 | 44.9 | Char |

TABLE VI-continued

| | Color (Yellowness Index) Value | | | | |
|---|---|---|---|---|---|
| Time (min) | Prior Art X | Prior Art Y | D (72 ppm Zn) | E (180 ppm Zn) | F (180 ppm Zn) |
| % weight loss | 20.1 | 12.3 | 1.1 | 0.6 | 0.2 |
| Color of clean out sheet | Bright Red to Pink | Light Pink | White | White | White |

EXAMPLE #3

Two stabilized flexible PVC resin formulations (one Prior Art, i.e., composition U as well as one of the instant invention, i.e., composition A) were made in accordance with the components and quantities thereof as shown in Table VII.

TABLE VII

| Component | Parts |
|---|---|
| PVC Resin | 100 |
| Impact Modifier | 11 |
| Epoxidized soybean oil | 15 |
| Processing Aid | 3 |
| Surfactant | 3 |
| Lubricant | 1.0 |
| Stabilizer | 1.3 |

The Yellowness Index was measured for the prior art stabilizer additive package in contrast to a composition of the instant invention using the composition of Table VII in a short term static heat stability test. As is clearly seen in the following Table VIII, the dynamic and static heat stability were not only equivalent to, but superior to a Prior Art formulation, but without additional heavy metals.

TABLE VIII

| Color (Yellowness Index) Value | | | Color (Yellowness Index) Value | | |
|---|---|---|---|---|---|
| Dynamic Thermal Stability | | | Static Thermal Stability | | |
| Time (min) | Prior Art U | A (120 ppm) | Time (min) | Prior Art U | A (120 ppm) |
| 0 | 15 | 7 | 0 | 5.2 | 3.1 |
| 3 | 26 | 14 | 10 | 8.3 | 5.0 |
| 6 | 45 | 30 | 20 | 12.7 | 6.4 |
| 9 | 62 | 51 | 30 | 18.5 | 13.2 |
| 12 | 96 | 78 | 40 | 30.1 | 18.1 |
| 15 | Char | char | 50 | 39.4 | 29.8 |
| 18 | | | 60 | 52.1 | 46.7 |
| | | | 70 | Char | 72.1 |
| | | | 80 | | Char |

EXAMPLE #4

While levels of Zn in the range of 100–500 ppm are believed to be preferred, depending on the level of performance desired by the end-user, higher levels of Zn, e.g., 480 ppm can be added to the system, but still achieve acceptable performance.

TABLE IX

| Component | Parts |
| --- | --- |
| PVC Resin | 100 |
| Plasticizer | 41 |
| Epoxidized soybean oil | 3 |
| CaCO$_3$ | 40 |
| Surfactant | 3 |
| ATH | 5 |
| Lubricants | 0.25 |
| Stabilizer | 2 |

The Yellowness Index was measured for the Prior Art stabilizer additive package in contrast to a composition of the instant invention using the compositions of Table IX in a short term static heat stability test. As is clearly seen in the following Table X, the heat stability was not only equivalent to, but superior prior art formulation, but without additional heavy metals. Additionally, the volatility of the stabilizers was significantly less than that exhibited by Prior Art formulations, which is directly attributable to plate out, which increases with volatility as evidenced by the red to pink color of the clean out sheet, an undesirable feature for PVC sheets or films.

TABLE X

| | Color (Yellowness Index) Value | |
| --- | --- | --- |
| Time (min) | Prior Art Z | G (480 ppm) |
| 0 | 8.9 | 6.1 |
| 20 | 9.5 | 7.3 |
| 60 | 15.8 | 12.1 |
| 110 | 30.7 | 28.9 |
| % weight loss | 36.1 | 0.9 |
| Color of clean out sheet | Bright Red to Pink | White |

EXAMPLE #5

The impact of Zn level with any one particular class of phosphite ester is was compared by using the formulation illustrated in Table XI with various levels of zinc in various phosphite stabilizers shown in Table XII. The level of zinc was varied from 0 ppm to 400 ppm.

TABLE XI

| Component | Parts |
| --- | --- |
| PVC Resin | 100 |
| Plasticizer | 45 |
| Epoxidized soybean oil | 5 |
| CaCO$_3$ | 20 |
| Stearic acid | 0.25 |
| Phosphite | 2 |

TABLE XII

| | Color (Yellowness Index) Value | | | |
| --- | --- | --- | --- | --- |
| Time (min) | 0 ppm Zn | 50 ppm Zn | 200 ppm Zn | 400 ppm Zn |
| Doverphos ® 675 | | | | |
| 0 | 51.9 | 14.1 | 3.9 | 3.5 |
| 20 | 62.7 | 14.9 | 4.6 | 3.2 |
| 50 | 72.5 | 50.2 | 13.1 | 12.0 |
| 70 | 91.5 | 66.8 | 23.5 | 26.1 |
| 90 | 100.7 | 75.2 | 39.6 | 58.3 |
| 110 | 135.4 | 88.5 | 61.2 | Char |
| Doverphos ® 12 | | | | |
| 0 | 50.2 | 14.1 | 2.9 | 3.0 |
| 20 | 60.4 | 15.6 | 3.5 | 3.2 |
| 50 | 75.2 | 55.9 | 12.8 | 11.5 |
| 70 | 89.3 | 75.2 | 23.9 | 19.4 |
| 90 | 100.1 | 89.0 | 38.7 | 36.4 |
| 110 | 131.8 | 98.8 | 59.4 | 67.6 |
| Doverphos ® 9EH | | | | |
| 0 | 51.9 | 9.2 | 4.1 | 3.0 |
| 20 | 65.2 | 12.8 | 4.7 | 4.0 |
| 50 | 74.9 | 55.6 | 12.8 | 11.5 |
| 70 | 96.2 | 66.6 | 22.5 | 37.3 |
| 90 | 108.6 | 75.4 | 45.5 | Char |
| 110 | 132.7 | 87.4 | 116 | |

It is seen that while there is a minimal value of zinc that must be added in order to achieve similar or superior stabilization, beyond a critical value of zinc, continued addition of zinc is detrimental to the system.

EXAMPLE #6

Roofing Membrane

A stabilization for a roofing membrane composition was performed using the composition of Table XIII was formulated using 4.5 phr of stabilizer, the Yellowness Index results of which are shown in Table XIV for several Prior Art additives

TABLE XIII

| Component | Parts |
| --- | --- |
| PVC Resin | 100 |
| Plasticizer | 45 |
| Epoxidized soybean oil | 5 |
| CaCO$_3$ | 20 |
| Stearic acid | 0.25 |
| Phosphite | various |

TABLE XIV

| | Color (Yellowness Index) Value | | | |
| --- | --- | --- | --- | --- |
| Time (min) | Ba/Cd | Ba/Zn | Ba/Cd/Zn | B |
| 0 | 1.4 | 1.2 | 1.6 | 1.5 |
| 30 | 1.7 | 1.5 | 2.2 | 1.7 |
| 75 | 8.9 | 9.9 | 8.3 | 5.8 |
| 120 | 12.7 | 16.7 | 10.8 | 9.9 |
| 150 | 15.7 | 21.9 | 15.1 | 14.4 |

EXAMPLE #7

A stabilization for a pool liner composition was performed using the composition of Table XIII was formulated using 3.5 phr of stabilizer, the Yellowness Index results of which are shown in Table XV for several Prior Art additives.

TABLE XV

| | Color (Yellowness Index) Value | | | |
|---|---|---|---|---|
| Time (min) | Ba/Cd | Ba/Zn | Ba/Cd/Zn | B |
| 0 | 1.7 | 1.1 | 1.6 | 1.2 |
| 20 | 2.2 | 1.9 | 2.3 | 1.5 |
| 40 | 4.1 | 3.5 | 3.5 | 3.3 |
| 70 | 11.8 | 8.1 | 9.8 | 7.7 |
| 100 | 16.2 | 22.7 | 21.8 | 13.2 |
| 120 | 23.0 | 36.0 | 32.5 | 21.9 |

EXAMPLE #8

A stabilization for a wall covering composition was performed using the composition of Table XIII was formulated using 4 phr of stabilizer, the Yellowness Index results of which are shown in Table XVI for several Prior Art additives.

TABLE XVII

| | Color (Yellowness Index) Values | | |
|---|---|---|---|
| Time (min) | Ba/Cd | Ba/Zn | B |
| 0 | 1.9 | 1.9 | 1.7 |
| 20 | 2.1 | 2.1 | 1.9 |
| 50 | 8.0 | 12.4 | 8.4 |
| 70 | 15.0 | 21.9 | 14.0 |
| 100 | 29.3 | 32.7 | 23.5 |
| 120 | Char | Char | 40.6 |

EXAMPLE #9

A stabilization for a flooring plastisol composition was performed using the composition of Table XVII was formulated using 5.5 phr of stabilizer, (reduced level 3.8 phr) the Yellowness Index results of which are shown in Table XVII for several Prior Art additives.

TABLE XVIII

| | Color (Yellowness Index) Values | | |
|---|---|---|---|
| Time (min) | Ba/Cd | B | B (70%) replacement |
| 0 | 1.8 | 1.7 | 2.1 |
| 10 | 2.5 | 2.1 | 2.7 |
| 25 | 6.1 | 5.1 | 6.3 |
| 40 | 22.1 | 14.3 | 16.7 |
| 50 | 43.7 | 21.8 | 27.2 |
| 60 | 60.06 | 33.9 | 60.0 |

EXAMPLE #10

While complete replacements of existing Prior Art additive packages are envisioned, there is no need to limit the invention to such. In fact, partial replacements are within the scope of the invention, such replacements ranging from 0.01% to 100% of the Prior Art additive.

TABLE XIX

| Component | Parts |
|---|---|
| PVC Resin | 100 |
| Plasticizer | 55 |
| Epoxidized soybean oil | 3 |
| $TiO_2$ | 7 |
| Stearic acid | 0.3 |
| Stabilizer | 3.5 |

TABLE XX

| | Color (Yellowness Index) Values | |
|---|---|---|
| Time (min) | W | B (50%) replacement |
| 0 | 1.1 | 0.8 |
| 20 | 1.9 | 1.7 |
| 40 | 2.5 | 2.3 |
| 80 | 13.4 | 10.4 |
| 100 | 22.7 | 14.9 |
| 120 | Char | 25.3 |

EXAMPLE #11

The performance of a substituted bisphenolic phosphite ester, DOVERPHOS 479 was compared to other phosphite esters using the formulation illustrated in Table XX with data as shown in Table XXI.

TABLE XXI

| Component | Parts |
|---|---|
| PVC Resin | 100 |
| Plasticizer | 38 |
| Epoxidized soybean oil | 3 |
| Stearic acid | 0.2 |
| Zinc stearate (10% Zn by weight) | 0.08 |
| Phosphite | Various |

TABLE XXII

| | Color (Yellowness Index) Value | | | | |
|---|---|---|---|---|---|
| Time | 2 phr Doverphos ® 4 | 2 phr Doverphos ® 479 | 1 phr Doverphos ® 479 | 0.4 phr Doverphos ® 479 | 2 phr Doverphos ® 53 |
| Time (min) at 180° C. | | | | | |
| 0 | 1.8 | 2.5 | 1.5 | 1.5 | 0.9 |
| 20 | 2.5 | 2.9 | 2.0 | 1.9 | 1.2 |
| 50 | 4.4 | 4.5 | 3.1 | 3.0 | 3.3 |

TABLE XXII-continued

| | | | Color (Yellowness Index) Value | | |
|---|---|---|---|---|---|
| Time | 2 phr Doverphos ® 4 | 2 phr Doverphos ® 479 | 1 phr Doverphos ® 479 | 0.4 phr Doverphos ® 479 | 2 phr Doverphos ® 53 |
| 80 | 56.6 | 9.4 | 7.6 | 16.5 | 12.1 |
| 110 | 89.1 | 13.4 | 19.0 | Char | 45.3 |
| 120 | char | 16.3 | 30.0 | | 107 |
| Time (hrs) at 80° C. | | | | | |
| 0 | 7.5 | 8.3 | 6.1 | 6.2 | 5.4 |
| 48 | 13.2 | 12.8 | 10.6 | 11.1 | 8.7 |
| 144 | 24.3 | 21.5 | 19.7 | 21.5 | 17.9 |
| 192 | 30 | 25.2 | 24.0 | 26.0 | 24.8 |
| 240 | 35.5 | 29.0 | 28.0 | 30.6 | 31.3 |
| 336 | 47.4 | 35.9 | 35.3 | 38.8 | 42.7 |
| 408 | 56.0 | 41.1 | 40.5 | 45.0 | 47.1 |
| 480 | 64.2 | 46.2 | 45.4 | 50.7 | 50.5 |
| Time (hrs) using Xenon Arc Weatherometer (63° C.) | | | | | |
| 0 | 7.5 | 8.3 | 6.1 | 6.2 | 5.4 |
| 24 | 12.8 | 9.7 | 6.4 | 6.2 | 5.6 |
| 120 | 31.4 | 22.0 | 13.3 | 13.3 | 7.9 |
| 168 | 34.9 | 24.4 | 21.8 | 16.4 | 9.1 |
| 263 | 37.0 | 35.3 | 22.4 | 17.3 | 11.3 |
| 287 | 50.0 | 50.0 | 25.4 | 17.5 | 12.8 |

Therefore, what has been shown is an effective replacement of Prior Art mixed metal stabilizers whereby at least a portion of the mixed metal stabilizer is substituted with an effective amount of phosphite ester/zinc combination, such effective amount determined as the addition of a sufficient amount to effect a positive change in a Yellowness Index value over a composition which had previously been stabilized with a mixed metal stabilizer.

The phosphite ester is selected from the group consisting of aryl phosphites, alkyl phosphites, aryl/alkyl phosphites, bisphenol-A phosphites, dialkylene glycol phosphites and polydialkylene glycol phosphites, pentaerythritol phosphites and p-cumyl phenol phosphites. As used in this application, the following formulas are derived from the specific examples provided and will have the following meanings:

Aryl phosphites

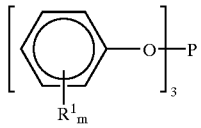

Wherein:
$R^1$ is independently selected from the group consisting of H, $C_{1-18}$ alkyl, $C_{1-18}$ alkoxy, halogens; and m is an integral value from 0 to 5 inclusive.

Alkyl phosphites

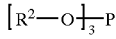

Wherein:
$R^2$ is selected from the group consisting of $C_{1-18}$ alkyl.

Alkyl/Aryl phosphites

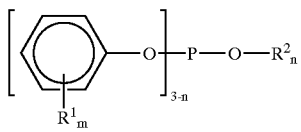

Wherein:
$R^1$ is as previously defined;
$R^2$ is as previously defined;
m is an integral value from 0 to 5 inclusive; and
n is an integral value from 1 to 2.

Bisphenol-A phosphites

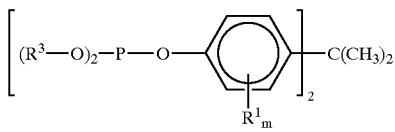

Wherein
$R^1$ is as defined previously;
$R^3$ is $C_{8-18}$ alkyl; and
m is an integral value from 0 to 5 inclusive.

| | -continued | |
|---|---|---|
| Polydialkylene glycol phosphites | 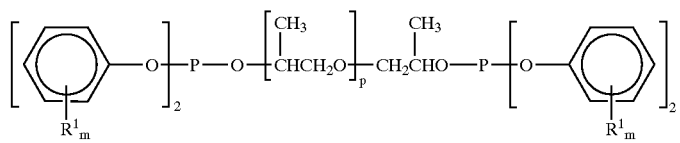 | Wherein:<br>$R^1$ is as defined previously;<br>m is an integral value from 0 to 5 inclusive; and<br>p is an integral value from 0 to 1 inclusive. |
| Pentaerythritol phosphites | 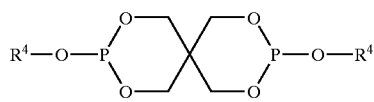 | Wherein:<br>$R^4$ is selected from the group consisting of $C_{8-18}$ alkyl; $C_{6-30}$ aryl, $C_{6-30}$ fused aryl rings, $C_{7-35}$ alklaryl, $C_{7-35}$ arylalkyl, and substituted derivatives thereof, wherein the substituents are selected from the group consisting of halogens, hydroxyl, $C_{1-4}$ alkyl, and $C_{1-4}$ alkoxy. |
| p-Cumyl phenol phosphites | 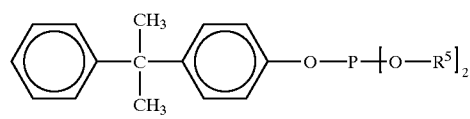 | Wherein:<br>$R^5$ is independently selected from the group consisting of $C_{8-18}$ alkyl; $C_{6-30}$ aryl, $C_{6-30}$ fused aryl rings, $C_{7-35}$ alklaryl, $C_{7-35}$ arylalkyl, and substituted derivatives thereof, wherein the substituents are selected from the group consisting of halogens, hydroxyl, $C_{1-4}$ alkyl, and $C_{1-4}$ alkoxy. |

As illustrated in the data, complex polyphosphites such as Doverphos® 12 and Doverphos® 675 outperformed simple phosphite esters as replacements for heavy metal components of mixed metal stabilizers. The zinc level was important to optimize the performance of the phosphite blends. Synergistic performances were observed with combinations of several phosphite esters, with the additional benefit of cost effectiveness. Also, ancillary properties of vinyl compounds such as clarity, light stability and plate out resistance improved markedly as polyphosphites replaced heavy metal components of mixed metal stabilizers. It is noted that the mixed phosphites can partially or totally replace conventional mixed metal stabilizers containing toxic metals such as barium and cadmium in many flexible PVC applications.

While not being held to any one theory of operation or mechanism of performance, it is believed that in the absence of barium or cadmium and in the presence of only low levels of zinc, the phosphite esters, either alone or in combination (i.e., PhosBoosters™) function as primary heat stabilizers principally by replacing labile chlorides on PVC via the classical Arbuzov Rearrangement mechanism. PhosBoosters™, when used at optimized levels in combination with catalytic amounts of zinc and normal levels of epoxidized soybean oil provide excellent early color hold and adequate long term stability to flexible PVC compounds. Their judicious use may compounders up to 25 percent reductions in stabilization costs.

In addition to saving money and eliminating toxic metals, the use of PhosBoosters™ mitigates the undesirable ancillary properties of vinyl compounds ordinarily associated with high use levels of barium and cadmium, namely, plate out, poor printability, viscosity drift in plastisols, haze, bloom, water blush and staining. PhosBoosters™ are colorless, clear, storage stable, low viscosity, nonvolatile, diluent free, 100% active liquids.

This invention has been described in detail with reference to specific embodiments thereof, including the respective best modes for carrying out each embodiment. It shall be understood that these illustrations are by way of example and not by way of limitation.

What is claimed is:

1. An essentially toxic-metal free liquid additive composition for use as at least a partial replacement of toxic metal stabilizer additive compositions for use in vinyl-containing resins, wherein the essentially toxic-free composition consists of:

(a) a $C_{10-15}$ alkyl ester bisphenol-A phosphite and $C_{1-9}$ alkyl substituted derivatives thereof;

(b) a zinc additive; and (c) wherein a molar ratio is from about 80:1 to 4:1.

2. The composition of claim 1 wherein said ratio is from about 75:1 to 6:1.

3. The composition of claim 2 wherein said ratio is from about 73:1 to 8:1.

4. The composition of claim 3 wherein said phosphite ester is $C_{10-15}$ alkyl bisphenol-A phosphites of formula (IV) and $C_{1-9}$ alkyl substituted derivatives thereof,

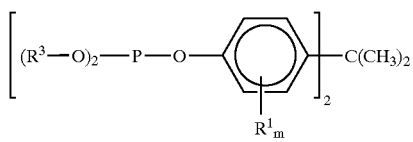

(IV)

wherein $R^1$ is independently selected from the group consisting of H and $C_{1-9}$ alkyl;

$R^3$ is $C_{10-15}$ alkyl; and m is an integral value from 0 to 1 inclusive.

5. The composition of claim 4 wherein
   (a) a percentage weight loss of said composition as measured as a difference between a start and an end weight of said composition as measured after exposure to two hours at 110° C., is less than 1% by weight.
6. The composition of claim 5 wherein
   (a) a percentage weight loss is less than 0.5% by weight.
7. An additive composition for polyvinyl chloride resin which consists of:
   (a) a $C_{10-15}$ alkyl bisphenol-A phosphite of formula (IV) and $C_{1-9}$ alkyl substituted derivatives thereof,

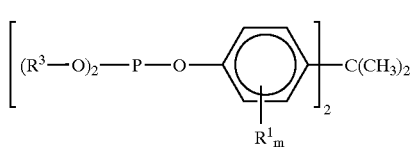

(IV)

wherein $R^1$ is independently selected from the group consisting of H and $C_{1-9}$ alkyl, $R^3$ is $C_{10-15}$ alkyl, and m is an integral value from 0 to 1 inclusive, and (b) zinc wherein a molar ratio of P/Zn ranges from 80:1 to 4:1.

8. The composition of claim 7 wherein
   (a) said molar ratio of P/Zn ranges from 75:1 to 6:1; and
   (b) said zinc is a zinc carboxylate.
9. The composition of claim 8 wherein
   (a) said molar ratio of P/Zn ranges from 73:1 to 8:1; and
   (b) said zinc carboxylate is selected from the group consisting of zinc octoate, zinc 2-ethylhexoate, zinc hexoate, zinc neodecoate, zinc decoate, zinc dodecanoate, zinc isostearate, zinc oleate, zinc stearate, zinc tallow fatty acids, zinc palmitate, zinc myristate, zinc laurate, and zinc benzoate.
10. The composition of claim 7 wherein
    (a) said phasphite ester is selected from the group consisting of $C_{12-15}$ bisphenol-A phosphite of formula (VIII) and

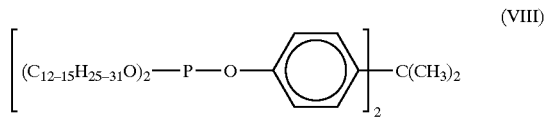

(VIII)

$C_{10}$ bisphenol-A phosphite of formula (IX)

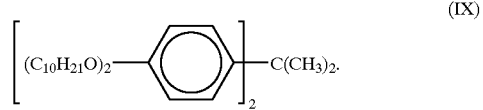

(IX)

* * * * *

UNITED STATES PATENT AND TRADEMARK OFFICE
CERTIFICATE OF CORRECTION

PATENT NO. : 6,824,711 B2
DATED : November 30, 2004
INVENTOR(S) : Stevenson et al.

It is certified that error appears in the above-identified patent and that said Letters Patent is hereby corrected as shown below:

<u>Column 20,</u>
Line 59, insert the words -- of P/Zn -- before "is from about".

Signed and Sealed this

Tenth Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,824,711 B2 Page 1 of 1
APPLICATION NO. : 10/086619
DATED : November 30, 2004
INVENTOR(S) : Stevenson et al.

It is certified that error appears in the above-identified patent and that said Letters Patent is hereby corrected as shown below:

IN THE CLAIMS:

Column 22, lines 30-35, by deleting formula (IX) and substituting therefor

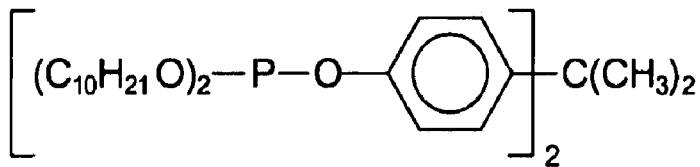

Signed and Sealed this

Twenty-sixth Day of February, 2008

JON W. DUDAS
*Director of the United States Patent and Trademark Office*